(12) United States Patent
Lee

(10) Patent No.: US 11,748,290 B2
(45) Date of Patent: Sep. 5, 2023

(54) MULTI-HOST SYSTEM, HOST EQUIPMENT, AND OPERATION METHOD FOR SHARING HUMAN-MACHINE INTERFACE DEVICE

(71) Applicant: GENESYS LOGIC, INC., New Taipei (TW)

(72) Inventor: Wei-Te Lee, New Taipei (TW)

(73) Assignee: GENESYS LOGIC, INC., New Taipei (TW)

( * ) Notice: Subject to any disclaimer, the term of this patent is extended or adjusted under 35 U.S.C. 154(b) by 0 days.

(21) Appl. No.: 17/586,780

(22) Filed: Jan. 28, 2022

(65) Prior Publication Data

US 2022/0276975 A1 Sep. 1, 2022

(30) Foreign Application Priority Data

Feb. 26, 2021 (TW) .................................. 110106862

(51) Int. Cl.
*G06F 13/40* (2006.01)
*G06F 13/42* (2006.01)

(52) U.S. Cl.
CPC ...... *G06F 13/4027* (2013.01); *G06F 13/4282* (2013.01); *G06F 2213/0042* (2013.01)

(58) Field of Classification Search
CPC ..... G06F 9/4415; G06F 13/387; G06F 13/426
See application file for complete search history.

(56) References Cited

U.S. PATENT DOCUMENTS

| | | | | |
|---|---|---|---|---|
| 2006/0227759 | A1* | 10/2006 | Bohm | G06F 13/4022 370/351 |
| 2007/0180181 | A1* | 8/2007 | Chen | G06F 13/426 710/316 |
| 2007/0245058 | A1* | 10/2007 | Wurzburg | G06F 13/4022 710/313 |
| 2012/0254486 | A1* | 10/2012 | Tausher | G06F 13/387 710/63 |
| 2019/0235880 | A1* | 8/2019 | Wu | G06F 9/4415 |

FOREIGN PATENT DOCUMENTS

TW 201537350 10/2015
TW M612860 6/2021

* cited by examiner

*Primary Examiner* — Getente A Yimer
(74) *Attorney, Agent, or Firm* — JCIPRNET

(57) ABSTRACT

A multi-host system, a host equipment, and an operation method for sharing a human-machine interface device are provided. The host equipment is controlled by human interface device (HID) operation information from another host equipment. The host equipment includes a universal serial bus (USB) host and a USB bridge device. The USB host receives the HID operation information from the another host equipment through a communication channel, and outputs the HID operation information through a USB downstream port of the USB host. A USB upstream port of the USB bridge device is coupled to the USB downstream port of the USB host to receive the HID operation information. The USB bridge device returns the HID operation information in an HID report form to the USB downstream port of the USB host through the USB upstream port of the USB bridge device.

20 Claims, 3 Drawing Sheets

MULTI-HOST SYSTEM, HOST EQUIPMENT, AND OPERATION METHOD FOR SHARING HUMAN-MACHINE INTERFACE DEVICE

CROSS-REFERENCE TO RELATED APPLICATION

This application claims the priority benefit of Taiwan application serial no. 110106862, filed on Feb. 26, 2021. The entirety of the above-mentioned patent application is hereby incorporated by reference herein and made a part of this specification.

BACKGROUND

Technical Field

The disclosure relates to an electronic system with a human interface device (HID), and particularly relates to a multi-host system, a host equipment, and an operation method for sharing a human-machine interface device.

Description of Related Art

In some application scenarios, a human-machine interface device connected to a computer may need to be shared with another computer. The human-machine interface device may also be referred to as a human interface device (HID), such as a mouse and/or a keyboard). For example, a mouse connected to a first computer may control a cursor of a second computer. Generally speaking, when the first computer receives a human-machine interface device report (such as an HID report) of the mouse, the first computer may know the operation of the mouse. The HID report is specified in the universal serial bus (USB) specification, so there will be no reiteration here. The first computer may send HID operation information of the mouse to the second computer through Ethernet. An application program (or a driver) running on the second computer may virtualize the HID operation information from the first computer into an operation event of the mouse, thereby controlling the cursor of the second computer.

In any case, the software environment of the second computer may be changed. For example, the operating system of the second computer may be updated or upgraded. After the software environment of the second computer is changed, the application program (or the driver) running on the second computer may face compatibility issues and may not work properly, thereby causing the sharing of the mouse and/or the keyboard connected to the first computer to fail. That is, after the software environment of the second computer is changed, the mouse and/or the keyboard of the first computer may not be able to remotely control the second computer.

It should be noted that the content of the "Description of Related Art" section is used to help understand the disclosure. Part of the content (or all of the content) disclosed in the "Description of Related Art" section may not be the conventional technology known to persons skilled in the art. The content disclosed in the "Description of Related Art" section does not represent that the content is already known to persons skilled in the art before the application of the disclosure.

SUMMARY

The disclosure provides a multi-host system, a host equipment, and an operation method for sharing a human-machine interface device, so that changes in the software environment will not easily affect the sharing of the human interface device (HID) between different host equipment.

In an embodiment of the disclosure, the host equipment is controlled by human-machine interface device operation information from another host equipment. The host equipment includes a universal serial bus (USB) host and a USB bridge device. The USB host is configured to receive the human-machine interface device operation information from the another host equipment through a communication channel. The USB bridge device is coupled to the USB host to receive the human-machine interface device operation information from the USB host. The USB bridge device returns the human-machine interface device operation information in a human-machine interface device report form to the USB host.

In an embodiment of the disclosure, the operation method for sharing the human-machine interface device is applicable between a first host equipment and a second host equipment. The first host equipment includes a main control software and is connected with the human-machine interface device. The second host equipment includes a controlled software and is connected to a USB bridge device. The operation method includes the following steps. The main control software sets a predetermined condition to determine whether to switch the human-machine interface device to the second host equipment. When the human-machine interface device triggers the predetermined condition, the main control software sends human-machine interface device operation information of the human-machine interface device to the controlled software of the second host equipment via a communication channel. After the controlled software receives the human-machine interface device operation information, the controlled software sends the human-machine interface device operation information to the USB bridge device. The USB bridge device returns the human-machine interface device operation information in a human-machine interface device report form to the second host equipment.

In an embodiment of the disclosure, the multi-host system includes a human-machine interface device, a first host equipment, and a second host equipment. The first host equipment is coupled to the human-machine interface device to receive a human-machine interface device report of the human-machine interface device. The first host equipment is configured to obtain human-machine interface device operation information corresponding to an operation of the human-machine interface device from the human-machine interface device report, and output the human-machine interface device operation information to a communication channel. The second host equipment is controlled by the human-machine interface device operation information from the first host equipment. The second host equipment includes a USB host and a USB bridge device. The USB host is configured to receive the human-machine interface device operation information from the first host equipment through the communication channel. The USB bridge device is coupled to the USB host to receive the human-machine interface device operation information. The USB bridge device returns the human-machine interface device operation information in a human-machine interface device report form to the USB host.

Based on the above, the multi-host system, the host equipment, and the operation method for sharing the human-machine interface device according to the embodiments of the disclosure use the USB bridge device to generate the human-machine interface device report of the human-machine interface device. After the USB host of the host equipment (the second host equipment) receives the human-machine interface device operation information from another host equipment (the first host equipment), the USB host may send the human-machine interface device operation information to the USB bridge device of the second host equipment. The USB bridge device may generate the human-machine interface device report to the USB host of the second host equipment according to the human-machine interface device operation information of the first host equipment. Therefore, the USB host may regard the USB bridge device as a physical human-machine interface device. Generally speaking, the processing of the human-machine interface device report (an interrupt event) sent by the physical human-machine interface device is not easily affected by changes in the software environment. After the USB bridge device returns the human-machine interface device operation information in the human-machine interface device report form to the USB host, the USB host of the second host equipment may process the human-machine interface device operation information of the first host equipment. Therefore, changes in the software environment will not easily affect the sharing of the human-machine interface device between different host equipment.

In order for the features and advantages of the disclosure to be more comprehensible, specific embodiments are described in detail below in conjunction with the accompanying drawings.

DETAILED DESCRIPTION OF DISCLOSED EMBODIMENTS

Figure 1:
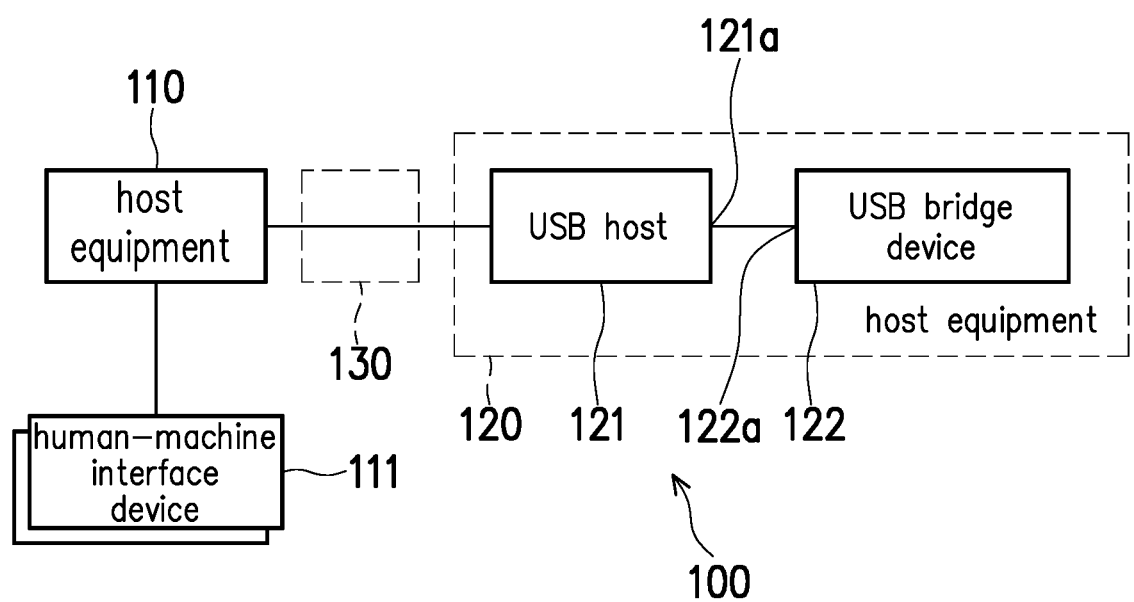
FIG. 1 is a schematic circuit block diagram of a multi-host system according to an embodiment of the disclosure.

The term "coupling (or connection)" used in the entire specification (including the claims) of the present application may refer to any direct or indirect connection means. For example, if a first device is described as being coupled (or connected) to a second device, it should be interpreted that the first device may be directly connected to the second device or the first device may be indirectly connected to the second device through another device or certain connection means. Terms such as "first" and "second" mentioned in the entire specification (including the claims) of the present application are used to name the elements or to distinguish between different embodiments or ranges, but not to limit the upper limit or lower limit of the number of elements or to limit the sequence of the elements. In addition, wherever possible, elements/components/steps using the same reference numerals in the drawings and embodiments represent the same or similar parts. Relevant descriptions in different embodiments may be made with reference to each other for the elements/components/steps using the same reference numerals or using the same terminologies.

FIG. 1 is a schematic circuit block diagram of a multi-host system 100 according to an embodiment of the disclosure. The multi-host system 100 includes multiple host equipment, and the host equipment send data to each other through a communication channel. For example, the multi-host system 100 shown in FIG. 1 includes a host equipment 110 and a host equipment 120, and the host equipment 110 and the host equipment 120 send data to each other through a communication channel 130. According to actual designs, the host equipment 110 may include a personal computer, a workstation, or other computing equipment. The number of host equipment of the multi-host system 100 should not be limited to the embodiment shown in FIG. 1. In other embodiments, the number of host equipment of the multi-host system 100 may be three or more.

The host equipment 110 is coupled to a human-machine interface device 111 to receive a human-machine interface device report (such as a human interface device (HID) report and an interrupt event) of the human-machine interface device 111. According to actual applications, the human-machine interface device 111 may be a human interface device (HID), such as a keyboard, a mouse, and/or other human-machine interface devices. According to actual applications, the human-machine interface device 111 may be coupled to the host equipment 110 through a universal serial bus (USB) or other connection interfaces. In some implementation examples, an HID report of the human-machine interface device 111 may be HID interrupt data conforming to the USB specification. The HID report of the human-machine interface device 111 may be defined in an HID descriptor presented by the human-machine interface device 111 to the host equipment 110.

The host equipment 110 may obtain HID operation information (human-machine interface device operation information, such as a movement vector of a mouse or which key of a keyboard is pressed) corresponding to an operation of the human-machine interface device 111 from the HID report of the human-machine interface device 111. The host equipment 110 may output the HID operation information of the human-machine interface device 111 to the communication channel 130. According to actual applications, the communication channel 130 may include a USB cable, Ethernet, a wireless local area network, and/or other communication networks.

The host equipment 120 receives the HID operation information from the host equipment 110 through the communication channel 130. Therefore, the host equipment 120 may be controlled by the HID operation information from the host equipment 110, that is, the host equipment 120 may be controlled by the operation of the human-machine interface device 111. In detail, in the embodiment shown in FIG. 1, the host equipment 120 includes a USB host 121 and a USB bridge device 122. According to actual designs, in some embodiments, the USB bridge device 122 may be a USB device. In other embodiments, the USB bridge device 122 may be a USB hub.

Figure 2:
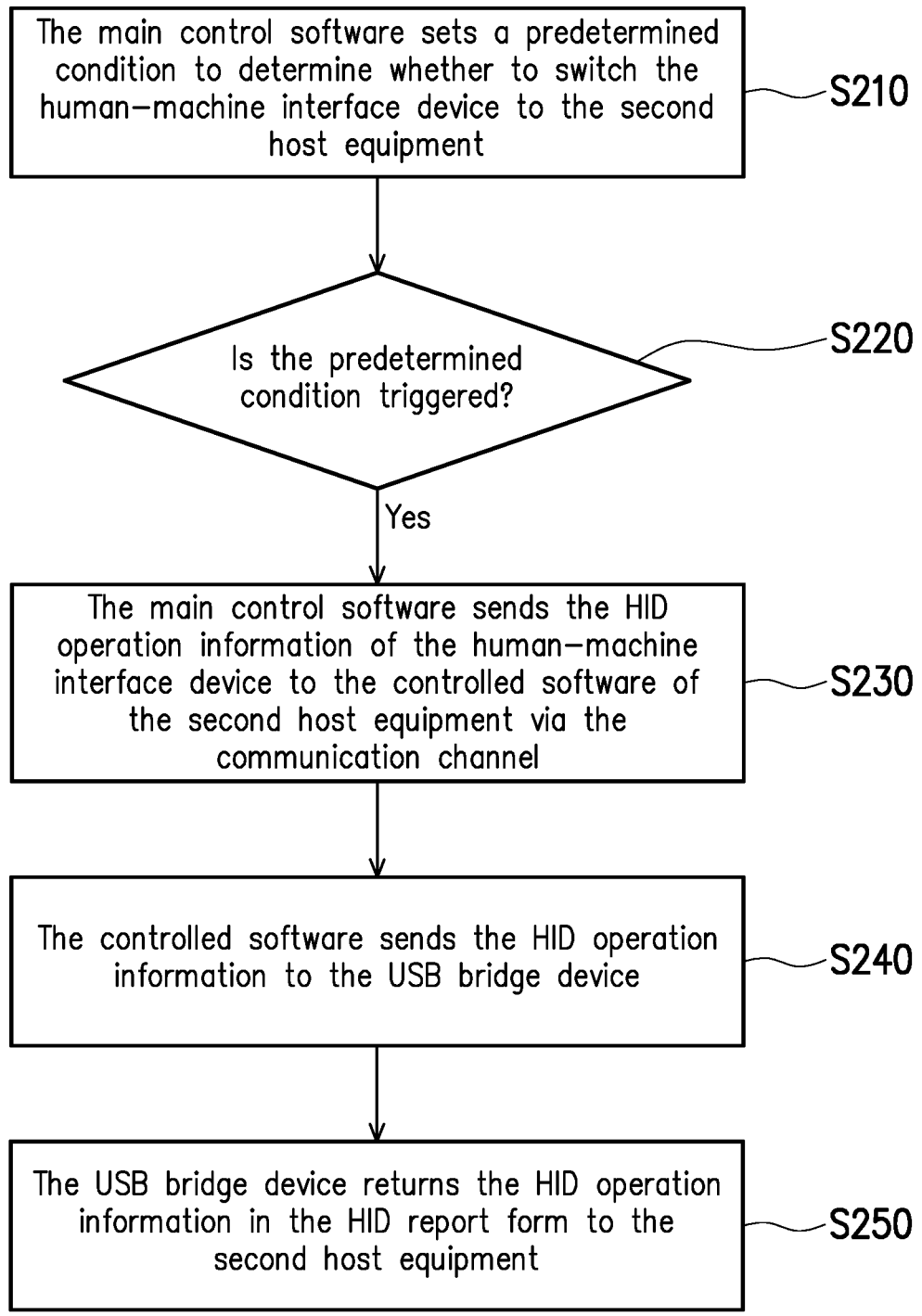
FIG. 2 is a schematic flowchart of an operation method for sharing a human-machine interface device according to an embodiment of the disclosure.

FIG. 2 is a schematic flowchart of an operation method for sharing a human-machine interface device according to an embodiment of the disclosure. Please refer to FIG. 1 and FIG. 2. The operation method for sharing the human-machine interface device may be applicable between the host equipment 110 and the host equipment 120 in FIG. 1. The host equipment 110 of this embodiment includes, for example, a main control software, and the host equipment 110 is connected with a human-machine interface device (such as the human-machine interface device 111). The host equipment 120 includes, for example, a controlled software, and the host equipment 120 is connected to the USB bridge device 122.

As shown in FIG. 2, in Step S210, the main control software of the host equipment 110 sets a predetermined condition to determine whether to switch the human-machine interface device 111 to the host equipment 120. The predetermined condition may be determined according to actual designs. For example, in some embodiments, the predetermined condition includes "whether a split screen corresponding to the host equipment 120 is activated". For example, a display screen of the host equipment 110 may have multiple split screens, and one of the split screens corresponding to the host equipment 120 may present the display screen of the host equipment 120. When the human-machine interface device 111 activates the split screen corresponding to the host equipment 120, the main control software of the host equipment 110 may determine that the "predetermined condition" has been triggered. In other embodiments, the predetermined condition includes "whether a picture-in-picture corresponding to the host equipment 120 is activated". For example, the display screen of the host equipment 110 may include a picture-in-picture, and a sub picture (or a main picture) corresponding to the host equipment 120 may present the display screen of the host equipment 120. When the human-machine interface device 111 activates the sub picture (or the main picture) corresponding to the host equipment 120, the main control software of the host equipment 110 may determine that the "predetermined condition" has been triggered. In still other embodiments, the predetermined condition includes "whether an operation cursor moves out of a frame". For example, when the operation cursor moves out of the frame of the display screen of the host equipment 110, the main control software of the host equipment 110 may determine that the "predetermined condition" has been triggered. In other embodiments, when the operation cursor of the human-machine interface device 111 on the display screen of the host equipment 110 moves to the frame of the display screen, moves into the split screen corresponding to the host equipment 120 in the display screen, or moves into a picture range of the picture-in-picture corresponding to the host equipment 120, the human-machine interface device 111 may trigger the predetermined condition.

The main control software of the host equipment 110 may determine whether the human-machine interface device 111 triggers the predetermined condition in Step S220. When the human-machine interface device 111 triggers the predetermined condition (the determination result of Step S220 is "yes"), Step S230 is executed. In Step S230, the main control software of the host equipment 110 may send the HID operation information of the human-machine interface device 111 to the controlled software of the host equipment 120 via the communication channel 130. That is, the USB host 121 of the host equipment 120 may receive the HID operation information from the host equipment 110 through the communication channel 130. After the controlled software running on the USB host 121 receives the HID operation information, the controlled software may send the HID operation information to the USB bridge device 122 (Step S240). That is, the controlled software of the USB host 121 outputs the HID operation information to a USB upstream port 122a of the USB bridge device 122 through a USB downstream port 121a of the USB host 121. According to actual designs, the USB host 121 may include a personal computer, a workstation, a server, or other computing equipment with a USB connector.

The USB upstream port 122a of the USB bridge device 122 of the host equipment 120 is, for example, coupled to the USB downstream port 121a of the USB host 121 through a USB cable. The USB bridge device 122 may receive the HID operation information output by the USB downstream port 121a of the USB host 121 through the USB upstream port 122a. That is, the USB bridge device 122 of the host equipment 120 may receive the HID operation information of the human-machine interface device 111 of the host equipment 110.

The USB bridge device 122 may generate the HID report of the human-machine interface device 111 according to the HID operation information of the human-machine interface device 111. For example, the USB bridge device 122 may convert the data format of the HID operation information output by the USB downstream port 121a of the USB host 121 into an HID report form. In Step S250, the USB bridge device 122 returns the HID operation information in the HID report form to the USB downstream port 121a of the USB host 121 through the USB upstream port 122a. The HID report form is interrupt data conforming to the USB HID specification. Therefore, the USB host 121 may regard the USB bridge device 122 as a physical human-machine interface device, thereby executing the corresponding HID operation (such as the movement vector of the mouse or which key of the keyboard is pressed) on the USB host 121.

This embodiment does not limit the implementation details of Step S250. For example, in some embodiments, when the USB bridge device 122 is connected to the USB host 121 of the host equipment 120, the USB bridge device 122 announces to the USB host 121 of the host equipment 120 that the human-machine interface device is mounted. In other embodiments, after the USB bridge device 122 receives the HID operation information from the USB host 121, the USB bridge device 122 announces to the USB host 121 of the host equipment 120 that the human-machine interface device is mounted. After the human-machine interface device is mounted, the USB host 121 may regard the USB bridge device 122 as a physical human-machine interface device. All suitable measures for the USB host 121 to regard the USB bridge device 122 as a physical human-machine interface device thereby enabling the USB host 121 to announce that the human-machine interface device is mounted belong to the spirit and scope of this technology, which is not limited by the disclosure.

In summary, the multi-host system 100 and the host equipment 120 use the USB bridge device 122 to generate the HID report of the human-machine interface device. After the USB host 121 of the host equipment 120 receives the HID operation information from another host equipment 110, the USB host 121 may send the HID operation information to the USB bridge device 122 of the host equipment 120. The USB bridge device 122 may generate the HID report conforming to the USB specification to the USB host 121 of the host equipment 120 according to the HID operation information of the host equipment 110. Therefore, the USB host 121 may regard the USB bridge device 122 as a physical human-machine interface device. The processing of the HID report (the interrupt event) sent by the physical human-machine interface device of this embodiment is not easily affected by changes in the software environment. After the USB bridge device 122 returns the HID operation information in the HID report form to the USB host 121, the USB host 121 of the host equipment 120 may process the HID operation information of the host equipment 110. Therefore, the sharing of the human-machine interface device between different host equipment 110 and 120 is not easily affected by changes in the software environment.

Figure 3:
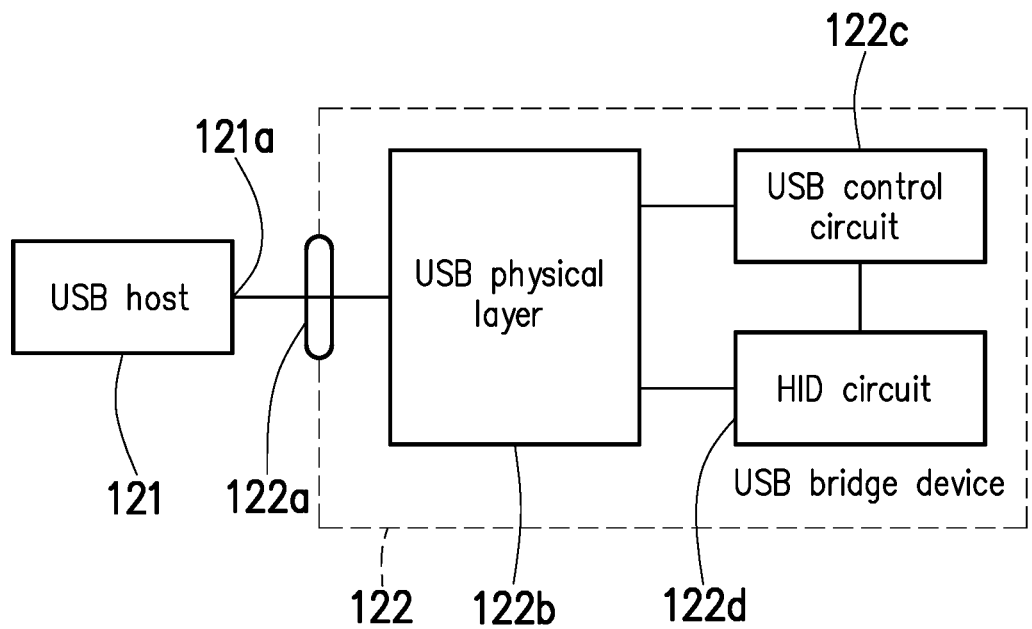
FIG. 3 is a schematic circuit block diagram of a universal serial bus (USB) bridge device shown in FIG. 1 according to an embodiment of the disclosure.

FIG. 3 is a schematic circuit block diagram of the USB bridge device 122 shown in FIG. 1 according to an embodiment of the disclosure. In the embodiment shown in FIG. 3, the USB bridge device 122 further includes a USB physical layer 122b, a USB control circuit 122c, and an HID circuit (human-machine interface device circuit) 122d. The USB physical layer 122b is coupled to the USB upstream port 122a of the USB bridge device 122. The USB physical layer 122b may receive the HID operation information output by the USB downstream port 121a of the USB host 121 through the USB upstream port 122a. The USB control circuit 122c is coupled to the USB physical layer 122b to receive the HID operation information. The HID circuit 122d is coupled to the USB control circuit 122c to receive the HID operation information. That is, the HID circuit 122d of the host equipment 120 may receive the HID operation information of the human-machine interface device 111 of the host equipment 110.

The HID circuit 122d may generate the HID report of the human-machine interface device according to the HID operation information (that is, the HID operation information of the human-machine interface device 111) provided by the USB control circuit 122c. For example, the HID circuit 122d may convert the data format of the HID operation information provided by the USB control circuit 122c into the HID report form. The HID report form is the interrupt data conforming to the USB HID specification. The HID circuit 122d may output the HID operation information in the HID report form to the USB physical layer 122b. Therefore, the USB physical layer 122b may return the HID operation information in the HID report form to the USB downstream port 121a of the USB host 121, and the USB host 121 may regard the USB bridge device 122 as a physical human-machine interface device.

According to different design requirements, the implementation of the USB control circuit 122c and/or the HID circuit 122d may be in the form of hardware, firmware, software (that is, programs), or a combination of multiple of the three. In terms of the form of hardware, the USB control circuit 122c and/or the HID circuit 122d may be implemented as logic circuits on an integrated circuit. The related functions of the USB control circuit 122c and/or the HID circuit 122d may be implemented as hardware using hardware description languages (such as Verilog HDL or VHDL) or other suitable programming languages. For example, the related functions of the USB control circuit 122c and/or the HID circuit 122d may be implemented in one or more controllers, microcontrollers, microprocessors, application-specific integrated circuits (ASICs), digital signal processors (DSPs), field programmable gate arrays (FPGAs), and/or various logic blocks, modules, and circuits in other processing units.

In terms of the form of firmware, the related functions of the USB control circuit 122c and/or the HID circuit 122d may be implemented as programming codes. For example, general programming languages (such as C, C++, or assembly language) or other suitable programming languages are used to implement the USB control circuit 122c and/or the HID circuit 122d. The programming codes may be recorded/stored in a "non-transitory computer readable medium", such as a read only memory (ROM), a hard disk (HDD), a solid-state drive (SSD), or other storage devices. For example, a tape, a disk, a card, a semiconductor memory, a programmable logic circuit, etc. may be used to implement the non-transitory computer readable medium. A central processing unit (CPU), a controller, a microcontroller, or a microprocessor may read and execute the programming codes from the recording medium, thereby implementing the related functions of the USB control circuit 122c and/or the HID circuit 122d.

Figure 4:
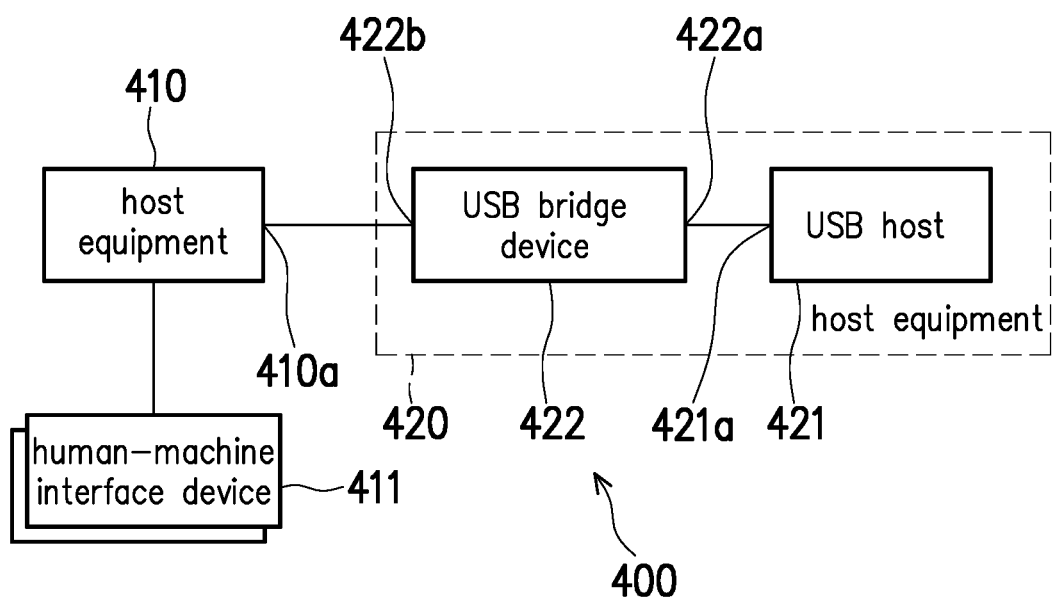
FIG. 4 is a schematic circuit block diagram of a multi-host system according to another embodiment of the disclosure.

FIG. 4 is a schematic circuit block diagram of a multi-host system 400 according to another embodiment of the disclosure. The multi-host system 400 includes multiple host equipment, such as a host equipment 410 and a host equipment 420. The host equipment 410 is coupled to a human-machine interface device 411 to receive an HID report (an interrupt event) of the human-machine interface device 411. The multi-host system 400, the host equipment 410, the human-machine interface device 411, and the host equipment 420 shown in FIG. 4 may be analogized with reference to the related descriptions of the multi-host system 100, the host equipment 110, the human-machine interface device 111, and the host equipment 120 shown in FIG. 1.

The host equipment 420 includes a USB host 421 and a USB bridge device 422. The USB host 421 shown in FIG. 4 may be analogized with reference to the related description of the USB host 121 shown in FIG. 1, and the USB bridge device 422 shown in FIG. 4 may be analogized with reference to the related description of the USB bridge device 122 shown in FIG. 1 or 3, so there will be no reiteration here. In the embodiment shown in FIG. 4, the USB bridge device 422 has a USB upstream port 422a and a USB upstream port 422b. The USB upstream port 422a of the USB bridge device 422 is coupled to a USB downstream port 421a of the USB host 421 through a USB cable. The USB upstream port 422b of the USB bridge device 422 is coupled to a USB downstream port 410a of the host equipment 410. In some embodiments, the USB bridge device 422 shown in FIG. 4 has a host bridge circuit to provide the communication channel between the host equipment 410 and the USB host 421. In other embodiments, when the USB downstream port 410a of the host equipment 410 and the USB downstream port 421a of the USB host 421 both conform to the USB4 specification, the USB bridge device 422 may support the inter-domain connection specified function by USB 4 to provide the communication channel between the host equipment 410 and the USB host 421.

Please refer to FIG. 2 and FIG. 4, in Step S210, the USB host 421 of the host equipment 420 may receive the HID operation information from the host equipment 410 through the communication channel provided by the USB bridge device 422, and output the HID operation information through the USB downstream port 421a of the USB host 421. In Step S220, the USB bridge device 422 may receive the HID operation information output by the USB downstream port 421a of the USB host 421 through the USB upstream port 422a. The USB bridge device 422 may generate the HID report of the human-machine interface device according to the HID operation information of the human-machine interface device 411. In Step S230, the USB bridge device 422 returns the HID operation information in the HID report form to the USB downstream port 421a of the USB host 421 through the USB upstream port 422a.

In summary, the multi-host system 400 and the host equipment 420 use the USB bridge device 422 to generate the HID report of the human-machine interface device. After the USB host 421 of the host equipment 420 receives the HID operation information from another host equipment 410, the USB host 421 may send the HID operation information to the USB bridge device 422 of the host equipment 420. The USB bridge device 422 may generate the HID report conforming to the USB specification to the USB host 421 of the host equipment 420 according to the HID operation information of the host equipment 410. After the USB bridge device 422 returns the HID operation information in the HID report form to the USB host 421, the USB host 421 of the host equipment 420 may process the HID operation information of the host equipment 410. Therefore, the sharing of the human-machine interface device between different host equipment 410 and 420 may not be affected by changes in the software environment. That is, even if the host equipment 410 and 420 use different operating software (systems), the host equipment 410 may still share the human-machine interface device connected thereto for the host equipment 420 to use.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be defined by the appended claims.

What is claimed is:

1. A host equipment, controlled by human-machine interface device operation information from another host equipment, the host equipment comprising:
   a universal serial bus (USB) host, configured to receive the human-machine interface device operation information from the another host equipment through a communication channel; and
   a USB bridge device, coupled to the USB host to receive the human-machine interface device operation information from the USB host, wherein the USB bridge device returns the human-machine interface device operation information in a human-machine interface device report form to the USB host.

2. The host equipment according to claim 1, wherein the USB host outputs the human-machine interface device operation information to a first USB upstream port of the USB bridge device through a USB downstream port of the USB host, and the USB bridge device returns the human-machine interface device operation information in the human-machine interface device report form to the USB downstream port of the USB host through the first USB upstream port of the USB bridge device.

3. The host equipment according to claim 2, wherein the USB bridge device comprises:
   a USB physical layer, coupled to the first USB upstream port of the USB bridge device and configured to receive the human-machine interface device operation information;
   a USB control circuit, coupled to the USB physical layer to receive the human-machine interface device operation information; and
   a human-machine interface device circuit, coupled to the USB control circuit to receive the human-machine interface device operation information, wherein the human-machine interface device circuit outputs the human-machine interface device operation information in the human-machine interface device report form to the USB physical layer to return the human-machine interface device operation information in the human-machine interface device report form to the USB downstream port of the USB host.

4. The host equipment according to claim 1, wherein the communication channel comprises an Ethernet network.

5. The host equipment according to claim 1, wherein the USB bridge device comprises a USB hub.

6. The host equipment according to claim 1, wherein the USB bridge device is further coupled to the another host equipment, and the USB bridge device provides the communication channel between the another host equipment and the USB host.

7. An operation method for sharing a human-machine interface device, applicable between a first host equipment and a second host equipment, wherein the first host equipment comprises a main control software and is connected with the human-machine interface device, and the second host equipment comprises a controlled software and is connected to a USB bridge device, the operation method comprising:
   setting a predetermined condition by the main control software to determine whether to switch the human-machine interface device to the second host equipment;
   sending human-machine interface device operation information of the human-machine interface device to the controlled software of the second host equipment via a communication channel by the main control software when the human-machine interface device triggers the predetermined condition;
   sending the human-machine interface device operation information to the USB bridge device by the controlled software after the controlled software receives the human-machine interface device operation information; and
   returning the human-machine interface device operation information in a human-machine interface device report form to the second host equipment by the USB bridge device.

8. The operation method according to claim 7, wherein the predetermined condition comprises: whether a split screen corresponding to the second host equipment is activated; whether a picture-in-picture corresponding to the second host equipment is activated; or whether an operation cursor moves out of a frame.

9. The operation method according to claim 8, wherein when the operation cursor of the human-machine interface device on a display screen of the first host equipment moves to the frame of the display screen, moves into the split screen corresponding to the second host equipment in the display screen, or moves into a picture range of the picture-in-picture, the human-machine interface device triggers the predetermined condition.

10. The operation method according to claim 7, wherein when the USB bridge device is connected to the second host equipment, the USB bridge device announces to the second host equipment that the human-machine interface device is mounted.

11. The operation method according to claim 7, wherein after the USB bridge device receives the human-machine interface device operation information, the USB bridge device announces to the second host equipment that the human-machine interface device is mounted.

12. The operation method according to claim 7, wherein the communication channel comprises an Ethernet network, and the USB bridge device comprises a USB hub.

13. The operation method according to claim 7, wherein the USB bridge device is further coupled to the first host equipment, and the USB bridge device provides the communication channel between the first host equipment and the second host equipment.

14. A multi-host system, comprising:
   a human-machine interface device;
   a first host equipment, coupled to the human-machine interface device to receive a human-machine interface device report of the human-machine interface device and configured to obtain human-machine interface device operation information corresponding to an operation of the human-machine interface device from the human-machine interface device report, and output the human-machine interface device operation information to a communication channel; and a second host equipment, controlled by the human-machine interface device operation information from the first host equipment, wherein the second host equipment comprises:
 a USB host, configured to receive the human-machine interface device operation information from the first host equipment through the communication channel; and
 a USB bridge device, coupled to the USB host to receive the human-machine interface device operation information, wherein the USB bridge device returns the human-machine interface device operation information in a human-machine interface device report form to the USB host.

15. The multi-host system according to claim 14, wherein the USB host outputs the human-machine interface device operation information to a first USB upstream port of the USB bridge device through a USB downstream port of the USB host, and the USB bridge device returns the human-machine interface device operation information in the human-machine interface device report form to the USB downstream port of the USB host through the first USB upstream port of the USB bridge device.

16. The multi-host system according to claim 15, wherein the USB bridge device comprises:

a USB physical layer, coupled to the first USB upstream port of the USB bridge device and configured to receive the human-machine interface device operation information;

a USB control circuit, coupled to the USB physical layer to receive the human-machine interface device operation information; and a human-machine interface device circuit, coupled to the USB control circuit to receive the human-machine interface device operation information, wherein the human-machine interface device circuit outputs the human-machine interface device operation information in the human-machine interface device report form to the USB physical layer to return the human-machine interface device operation information in the human-machine interface device report form to the USB downstream port of the USB host.

17. The multi-host system according to claim 14, wherein the communication channel comprises an Ethernet network.

18. The multi-host system according to claim 14, wherein the USB bridge device comprises a USB hub.

19. The multi-host system according to claim 14, wherein the USB bridge device is further coupled to the first host equipment, and the USB bridge device provides the communication channel between the first host equipment and the USB host.

20. The multi-host system according to claim 14, wherein the human-machine interface device comprises a keyboard or a mouse.

* * * * *